United States Patent
Roosen et al.

Patent Number: 6,152,767
Date of Patent: Nov. 28, 2000

[54] CABLE CLOSURE

[75] Inventors: Dirk Roosen, Tienen; Francis Dams, Edegem; Dirk Diddens, Holsbeek; Maarten Michiels, Kortenberg, all of Belgium

[73] Assignee: N.V. Raychem S.A., Kessel-Lo, Belgium

[21] Appl. No.: 09/117,008

[22] PCT Filed: Jan. 23, 1997

[86] PCT No.: PCT/GB97/00196

§ 371 Date: Jul. 17, 1998

§ 102(e) Date: Jul. 17, 1998

[87] PCT Pub. No.: WO97/27655

PCT Pub. Date: Jul. 31, 1997

[30] Foreign Application Priority Data

Jan. 24, 1996 [GB] United Kingdom .................... 9601370
May 31, 1996 [GB] United Kingdom .................... 9611370

[51] Int. Cl.$^7$ .................................................. H01R 13/40
[52] U.S. Cl. .............................................................. 439/587
[58] Field of Search ................................... 439/587, 589; 174/92, 177 R, 93

[56] References Cited

U.S. PATENT DOCUMENTS 4,554,401 11/1985 Ball ............................................ 174/92
4,558,174 12/1985 Massey et al. ............................. 174/92
4,845,314 7/1989 Pichler et al. .
5,199,901 4/1993 Balser et al. ............................. 439/587
5,928,033 7/1999 Kato et al. ................................ 439/587

FOREIGN PATENT DOCUMENTS 0 538009 A2 10/1992 European Pat. Off. .
27 43 937 4/1979 Germany .
95 06347 3/1995 WIPO .
95 15600 6/1995 WIPO .

*Primary Examiner*—Brian Sircus
*Assistant Examiner*—J. F. Duverne
*Attorney, Agent, or Firm*—Allen, Dyer, Doppelt, Milbrath & Gilchrist, P.A.

[57] ABSTRACT

A cable closure is provided with at least two housing parts which, in use, are brought together, and when brought together provide a cavity for containing sealing material, through which one or more cables may extend into the closure. The cable closure also includes a sealing material which is contained in the cavity upon bringing the housing parts together, and, which seals between the cable (s) and the housing part(s); and at least one resilient member which, in use, is contained in the cavity. When the housing parts are brought together, in use, the resilient member is compressed, and thus causes the resilient member, by its resilience, to apply a compressive force to the sealing material.

17 Claims, 7 Drawing Sheets

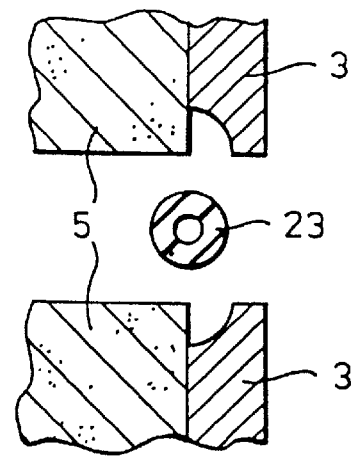
Fig.5A.
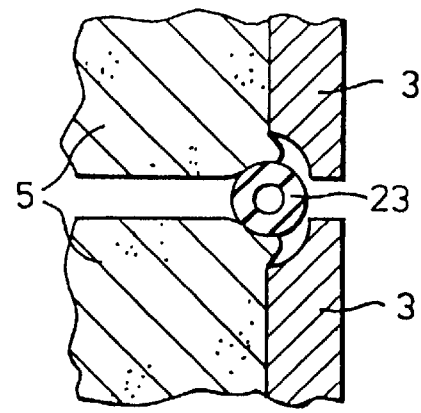
Fig.5B.
Fig.5C.
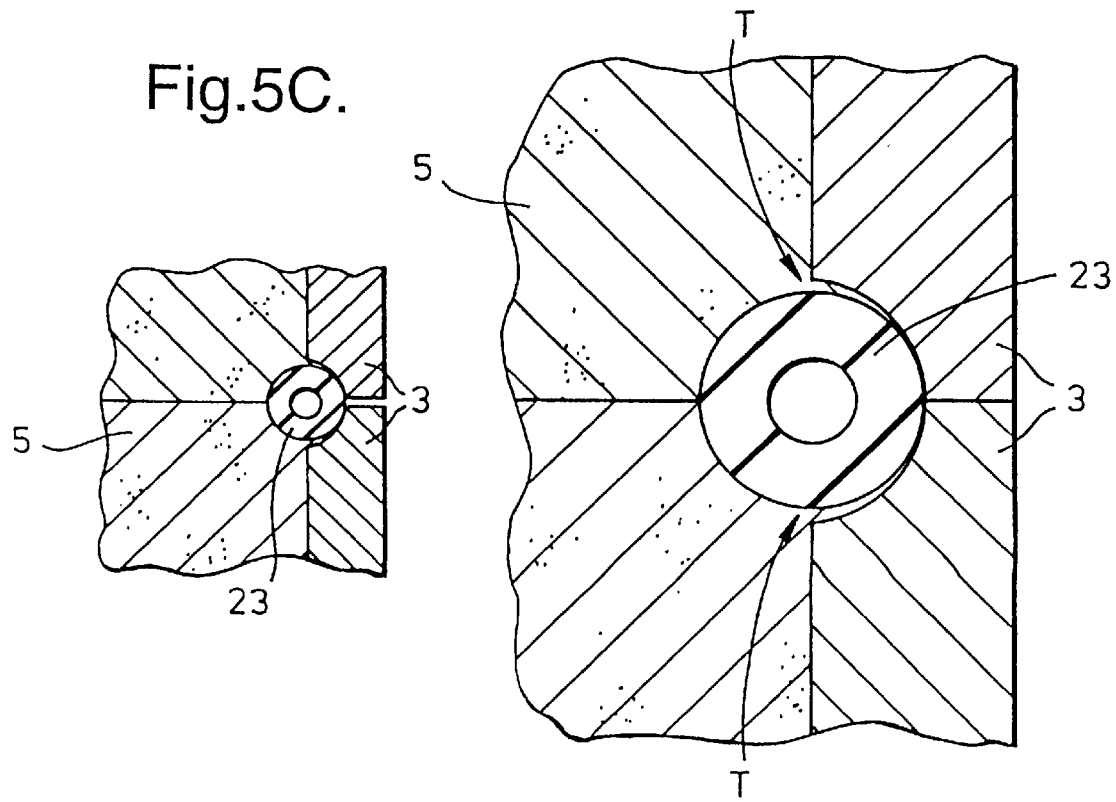

CABLE CLOSURE

FIELD OF THE INVENTION

The present invention relates to a cable closure, for example, a cable splice closure for enclosing a splice between cables. The types of cable include telecommunications cable (either conductive or optical fiber), an electrical cable or other conductive cable, a wire or other conductor, or an optical fiber. The closure may, for example, enclose stored optical fibers and connections between optical fibers.

BACKGROUND OF THE INVENTION

There are many different types of cable closures, most of which form a sealed environment by being sealed around the cable(s) which they enclose. Such seals are produced in a wide range of ways. One general way in which they are produced is to provide a cavity or chamber at an end (or, ordinarily, two ends) of the closure, through which cavity the cable(s) extend, and to provide sealing material in the cavity to form a seal around the cable(s). For example, U.S. Pat. No. 3,796,823 discloses a cable splice case in the form of half-shells in which the end seals are formed by resilient grommets in compressive engagement with the case and the cable(s). The grommets slot between shoulders in the splice case, and there are strips of sealing tape for sealing along the length of the splice case between the half-shells.

International Patent Application No. PCT/GB94/02622 (publication no. WO 95/15600) discloses a device for forming a seal around an elongate object (e.g. a cable) comprising: (a) a sealing plate having a hole through which the object can pass, and containing a chamber in communication with the hole; (b) a pressure plate positioned within and movable relative to the chamber; and (c) a sealing material positioned within the chamber such that when the elongate object passes, in use, through the hole in the sealing plate, the sealing material is positioned between the pressure plate and the elongate object, wherein the pressure plate can be moved, in use, towards the object in a direction transversely of the object, to urge the sealing material into sealing contact with the object.

The device disclosed in PCT/GB94/02622 performs extremely well, but it would be desirable to have a cable closure which is sealed equally well but which would be cheaper to manufacture and simpler to install. A purpose of the present invention is to provide such a cable closure.

SUMMARY OF THE INVENTION

According to a first aspect of the present invention, there is provided a cable closure, comprising:

(a) at least two housing parts which, in use, are brought together, and when brought together provide a cavity for containing sealing material, through which cavity one or more cables may extend into the closure;

(b) sealing material which is contained in the cavity upon bringing the housing parts together, and which seals between the cable(s) and the housing part(s); and (c) at least one resilient member which, in use, is contained in the cavity; wherein bringing the housing parts together, in use, causes the resilient member to be compressed, and thus causes the resilient member, by its resilience, to apply a compressive force to the sealing material.

One advantage of the invention is that a compressive force is applied to the sealing material merely by bringing the housing parts together. It thus avoids the necessity of subsequently moving a pressure plate towards the cable(s) in order to apply such a compressive force to the sealing material, thereby reducing the complexity (and enabling a reduction in the cost) of the closure compared to that disclosed in PCT/GB94/02622, and also simplifying the installation procedure compared to the procedure required for that closure. The need to simplify (and thus to shorten) the installation procedure and the tools needed for installation, and also the need to reduce the costs associated with manufacturing closures, are becoming increasingly important.

There are a number of reasons why applying a compressive force to the sealing material by a resilient member in the cavity may be advantageous. One reason is that, at least in preferred embodiments, the resilient member may urge the sealing material into sealing contact with the cable(s) extending into the closure. Another reason is that, at least for some preferred sealing materials, e.g. gels (as described below), the sealing properties of the materials are improved when the material are put under compression. The closure will normally be required to remain sealed for long periods of time (e.g. months, or more typically, years), and during these time periods it will normally be subjected to wide fluctuations in temperature. It is generally for these reasons that the sealing material is put under compression by a resilient member, i.e. a member which will normally apply biased compression to the sealing material. This has the advantage that changes in the volume of the sealing material (e.g. due to changes in temperature) and/or creep, exudation etc. of the sealing material are normally automatically accommodated by the resilience of the resilient member, while maintaining the compressive force on the sealing material. Due to its resilience, the resilient member preferably expands or contracts automatically as appropriate in the relevant direction in response to expansion, contraction or loss of sealing material, and thus it substantially maintains its compression on the sealing material.

The resilient member is preferably compressed in a direction which is substantially lateral and more preferably substantially perpendicular, to the direction in which the cable(s) extend(s) through the cavity. Additionally or alternatively, the resilient member is preferably situated, in use, laterally spaced apart from the cable, e.g. between the sealing material and the housing part. The resilient member is preferably compressed, upon closing the housing parts around the cable(s), by sealing material, preferably between the sealing material and one or more housing parts.

The resilient member may advantageously comprise at least one spring, and preferably at least one leaf spring and/or helical spring. The resilient member(s) may further comprise at least one plate or other component which transfers the compressive force from the or each spring to the sealing material. Additionally or alternatively, the resilient member may be formed at least partly from at least one resilient polymeric material, preferably an elastomer, and more preferably a natural or a synthetic rubber (e.g. silicone rubber). The resilient polymeric material may, for example, comprise a polymeric foam material. A particularly preferred form of resilient member comprises a tube or other hollow resilient polymeric member. The resilient member may be an integral part of at least one of the housing parts, but preferably is separate from, and insertable into, the housing part(s).

In preferred embodiments of the invention, the closure further comprises at least one gripping member for gripping one or more cable(s) extending, in use, through the cavity. The gripping member(s) preferably secure(s) the cable(s)

with respect to the housing part(s). The gripping member preferably attaches directly to the housing parts, or at least one of the housing parts.

Advantageously, the gripping member may be in the form of a strip which, in use, is wound around one or more cable(s) and which preferably interlocks with at least one of the housing parts when the housing parts are brought together.

The strip may, for example, be a retention strip as disclosed in International Patent Application No. PCT/GB95/02229 (the entire disclosure of which is incorporated herein by reference). In other words, the strip may comprise a retention strip for winding around an elongate object (e.g. one or more cable(s), which when so wound in use can decrease in length when compressed around the object, thereby allowing contraction of the strip around the object.

The retention strip may comprise one or more, preferably a plurality, of collapsible portions, and the strip can preferably decrease in length due to the collapsing of one or more of the collapsible portions. The collapsible portion(s) may collapse by any of a variety of mechanisms, for example by telescoping (in a manner similar to a collapsible telescope). Preferably, however, the collapsible portion can collapse by deforming, e.g. by being crushed or concertinaed or by buckling. The collapsible portion thus preferably comprises a relatively weak portion of the retention strip, and more preferably comprises one or more webs extending between substantially non-collapsible portions, e.g. one or more relatively thin portions which can be deformed.

Preferably, the retention strip comprises a plurality of alternately collapsible and non-collapsible portions along at least part, preferably all, of the length thereof. This has the advantage of normally providing substantially uniform collapsibility along the length of the strip, such that the strip may contract relatively or substantially uniformly around one or more cables.

The housing parts which provide the cavity for containing the sealing material preferably also substantially enclose a cable splice when brought together in use, i.e. the cavity for containing the sealing material is preferably provided as an integral part of the housing parts of a cable splice closure. This has the advantage of providing a very simple but extremely reliably sealed cable splice closure. The housing parts are preferably two half shells which may be secured together. Additionally or alternatively, the housing parts may be joined prior to being brought together in use, e.g. hinged or otherwise pivotally joined. The housing parts may, for example, be integrally joined, e.g. by one or more so-called living hinges. The housing parts are preferably made from a plastic material, e.g. polypropylene, but other materials, e.g. metal, could be used.

The cavity provided for the gel by the housing parts is preferably defined by at least two spaced-apart walls of at least one, preferably each, housing part, which walls are preferably integral with the rest of the housing parts. The walls preferably have at least one opening therein, to permit one or more cables to extend through the cavity. Alternatively, portions of the walls may be cut-away or otherwise removed as and when required, in order to provide the necessary opening(s). To this end, the walls may have frangible portions and/or interlocking removable portions, for example.

In some preferred embodiments of the invention, at least one of the housing parts further comprises one or more containment means arranged to contain the sealing material in the cavity while the housing parts are being brought together in use. The containment means preferably comprises a barrier extending from one of the housing parts such that it overlaps part of another, or the other, housing part at a periphery of the cavity as the housing parts are brought together. As the housing parts are brought together, the barrier(s) preferably overlap(s) the other housing part before the sealing material begins to experience a compressive force; in this way, substantially complete containment of the sealing material in the cavity can normally be assured. If the containment means were not present, some egress of the sealing material between the housing parts due to some compression of the sealing material before complete closure of the cavity might, at least in some circumstances, occur.

In particularly preferred embodiments of the invention, the closure further comprises one or more elongate sealing member(s) which, in use, seal(s) between opposed edge faces of the housing parts, and which preferably also sealingly contact(s) the sealing material in the cavity. By such sealing contact with the sealing material in the cavity, the so-called triple points of the closure (i.e. those points at which, for example, an end seal meets a longitudinal seal between opposed edge faces of the housing parts) may be sealed. Ensuring that the triple points of a closure are sealed is often the most difficult aspect of designing a sealing system for closure, because at the triple point, a seal between three surfaces needs to be formed (instead of a seal between two surfaces, which is ordinarily the case elsewhere in the closure). For the avoidance of doubt, an "elongate" sealing member is to be understood as including the possibility of the sealing member being endless, i.e. an O-ring. Ordinarily, however, the elongate sealing member will have two ends.

The inventors of the present invention have discovered that the seal at the triple point(s) may be improved if a portion of part of the length of the elongate sealing member protrudes transversely into the cavity (i.e. transversely with respect to the general direction in which the sealing member(s) and the cable(s) extend(s)). Preferably substantially the entire transverse periphery of the protruding portion of the sealing member sealingly contacts the sealing material in the cavity. It is particularly preferred that the proportion of the sealing member which protrudes into the cavity comprises at least about a third of the transverse cross-sectional area of that part of the sealing member. Apart from having the advantage of increasing the surface area of sealing contact between the sealing material and the sealing member, this preferably also has the advantage of improving the accessibility of the triple point(s) to the sealing material, and thus of improving the sealing of the triple point(s).

Accordingly, a second aspect of the invention provides a cable closure, comprising:
  (a) at least two housing parts which, in use, are brought together, and when brought together provide a cavity for containing sealing material, through which cavity one or more cables may extend into the closure;
  (b) sealing material which is contained in the cavity upon bringing the housing parts together, and which seals between the cable(s) and the housing part(s); and
  (c) one or more elongate sealing members which, in use, seal(s) between opposed edge faces of the housing parts, and which also sealingly contact(s) the sealing material in the cavity;
    wherein a portion of part of the length of the elongate sealing member, the portion comprising at least about a third of the transverse cross-sectional area thereof, protrudes transversely into the cavity, and substantially the entire transverse periphery of the portion sealingly contacts the sealing material in the cavity.

Advantageously, the portion(s) of the elongate sealing member(s) which protrude(s) into the cavity may comprise about a half of the transverse cross-sectional area of the length(s) of the sealing member(s). The opposed edge faces of the housing parts are preferably narrower in transverse width where they are immediately adjacent to the cavity than they are elsewhere, such relative narrowness causing the portion(s) of the sealing member(s) to protrude transversely into the cavity.

The inventors have further discovered that it is often advantageous for some of the sealing material in the cavity to become trapped between the elongate sealing member and each opposed edge face of the housing part upon bringing the housing parts together. It is believed that this may, at least in some circumstances, improve the sealing at the triple point. Thus, in some preferred embodiments of the invention, a gap which is open to the cavity is provided between the elongate sealing member and each opposed edge face of the housing part, in which gap some of the sealing material becomes trapped upon bringing the housing parts together. The gap may be provided in the housing parts (e.g. by one or more "cut-away" portions) and/or providing at least the relevant part of the elongate sealing member with a reduced thickness.

The elongate sealing member(s) which seal(s) between opposed edge faces of the housing parts may generally have any transverse cross-sectional shape, e.g. substantially polygonal, especially substantially square or rectangular. It is preferred, however, for the elongated sealing member to be generally round in transverse cross-sectionally shape, more preferably substantially circular. Advantageously, the elongate sealing member(s) may be hollow, e.g. tubular and/or formed from foamed material. Preferred materials for the elongate sealing member(s) are polymeric materials, especially resilient polymeric materials, e.g. elastomers, especially natural or synthetic rubbers (e.g. silicone rubbers).

The sealing material which is contained in the cavity may generally comprise any suitable sealing material. A particularly preferred sealing material is gel. The gel may, for example, comprise silicone gel, urea gel, urethane gel, thermoplastic gel, or any suitable gel or gelloid sealing material. Preferred gels comprise an oil-extended polymer composition. Preferably the gel has a hardness at room temperature as determined using a Stevens-Volland Texture Analyser of greater than 45 g, particularly greater than 50 g, especially greater that 55 g, e.g. between 55 g and 60 g. It preferably has a stress relaxation of less than 12%, particularly less than 10% and especially less than 8%. Ultimate elongation, also at room temperature, is preferably greater than 100%, more preferably greater than 600%, especially greater than 1000%, particularly greater than 1400%, as determined according to ASTM D638. Tensile modulus at 100% strain is preferably at least 1.8 MPa more preferably at least 2.2 MPa. In general, compression set is preferably less than 35%, more preferably less than 25%, especially less than 15%. Preferably, the gel has a cone penetration as measured by ASTM D217 of at least 50 ($10^{-1}$ mm), more preferably at least 100 ($10^{-1}$ mm), even more preferably at least 200 ($10^{-1}$ mm) and preferably no greater than 400 ($10^{-1}$ mm), especially no greater than 350 ($10^{-1}$ mm). The polymer composition of the gel may for example comprise an elastomer, or a block copolymer having relatively hard blocks and relatively elastomeric blocks. Examples of such copolymers include styrenediene block copolymers, for example styrene-butadiene or styrene-isoprene diblock or triblock copolymers e.g. as disclosed in international patent publication number WO 88/00603. Preferably, however, the polymer composition comprises one or more styrene-ethylene-propylene-styrene block copolymers. The extender liquids employed in the gel preferably comprise oils. The oils may be hydrocarbon oils, for example paraffinic or napthenic oils, synthetic oils for example polybutene or polypropene oils, and mixtures thereof. The preferred oils are mixtures of non-aromatic paraffins and napthenic hydrocarbon oils. The gel may contain additives, e.g. such as moisture scavengers (e.g. Benzoyl chloride), antioxidants, pigments and fungicides.

Other sealing material which can be used include polymeric (e.g. silicone) foam materials, elastomeric materials, e.g. natural or synthetic rubber, mastics, or greases, e.g. silicone grease.

BRIEF DESCRIPTION OF THE DRAWINGS

The invention will now be described, by way of example, with reference to the accompanying drawings, of which:

FIGS. 5A–5C illustrate the formation of a triple point seal in a cable closure according to the invention.

DETAILED DESCRIPTION OF THE PREFERRED EMBODIMENTS

Figure 1A:
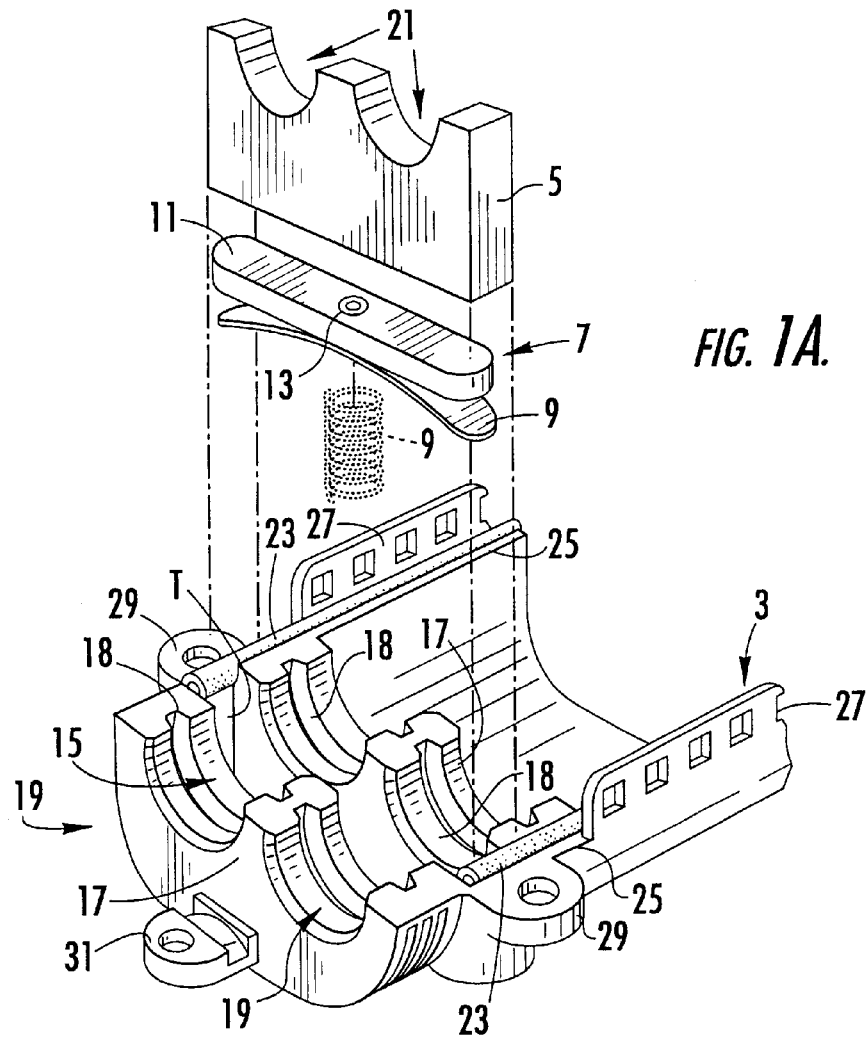
FIGS. 1A–1B illustrate, in perspective, part of a cable closure according to the invention.

FIG. 1A illustrates, in perspectives, part of one housing part 3 of a cable closure 1 according to the invention. The housing part 3 comprises a half-shell which, in use, is brought together with another half-shell (not illustrated) to enclose a cable splice (for example). Also illustrated is a block of sealing material 5 (e.g. gel) and a resilient member 7, comprising a leaf spring 9 and a plate 11 which are joined together by a rivet or other connection means 13.

The housing part 3 includes a cavity 15 which comprises half of a complete cavity which is formed, in use, when the two housing parts are brought together. The cavity 15 is provided between the first and second spaced apart walls 17, in which walls are provided two openings 19 through which cables may extend into the closure 1. As indicated by the dashed lines, the resilient member 7 is situated between the sealing material 5 and an internal wall of the cavity 15, and when the housing parts 3 are brought together around one or more cables, the sealing material 5 is compressed against the resilient member 7, thus causing the resilient itself to be compressed, and consequently causing the resilient member, by its resilience, to apply a compressive force on the sealing material. In the embodiment illustrated in FIG. 1, the other half-shell housing part (not illustrated) will also contain a block of sealing material 5 similar to that illustrated; it may or may not contain another resilient member 7 in addition to the one illustrated. The sealing material blocks 5 include openings 21 for cables.

The half-shell housing part 3 illustrated in FIG. 1A includes two elongate sealing members 23, in the form of elastomeric tubes (e.g. formed from silicone rubber), which seal, in use, between the opposed longitudinal edge faces 25 of the two half-shell housing parts. The elongate sealing member 23 each sit in grooves provided in the longitudinal edge faces 25 of the housing parts. Where the longitudinal edge faces 25 are immediately adjacent to the cavity 15, they are narrower in transverse width (i.e. width transverse to the longitudinal, or cable, direction) than they are elsewhere. This relative narrowness at the cavity 15 causes a portion of the length of each elongate sealing member 23 adjacent to the cavity to protrude transversely into the cavity. The narrowness of the edge faces 25 in the region of the cavity may be thought of as a removal of an internal portion (e.g. about half of the walls, which causes the elongate sealing members to protrude in a transverse direction into the cavity 15, preferably such that at least about a third, e.g. about a half, of their transverse cross-sectional area protrudes into the cavity. This has the advantage of increasing the contact area between the elongate sealing members 15 and the sealing material 5 at the so-called triple points T (i.e. the point of intersection of the longitudinal seals -i.e. the elongate sealing members 23-with the end seals-i.e. the sealing material blocks 5). It also has the advantage of increasing the accessibility of the triple points T to the sealing material 5, thus improving the penetration or wetting by the conformable sealing material at the triple points. This is illustrated in FIG. 5.

Figure 6A:
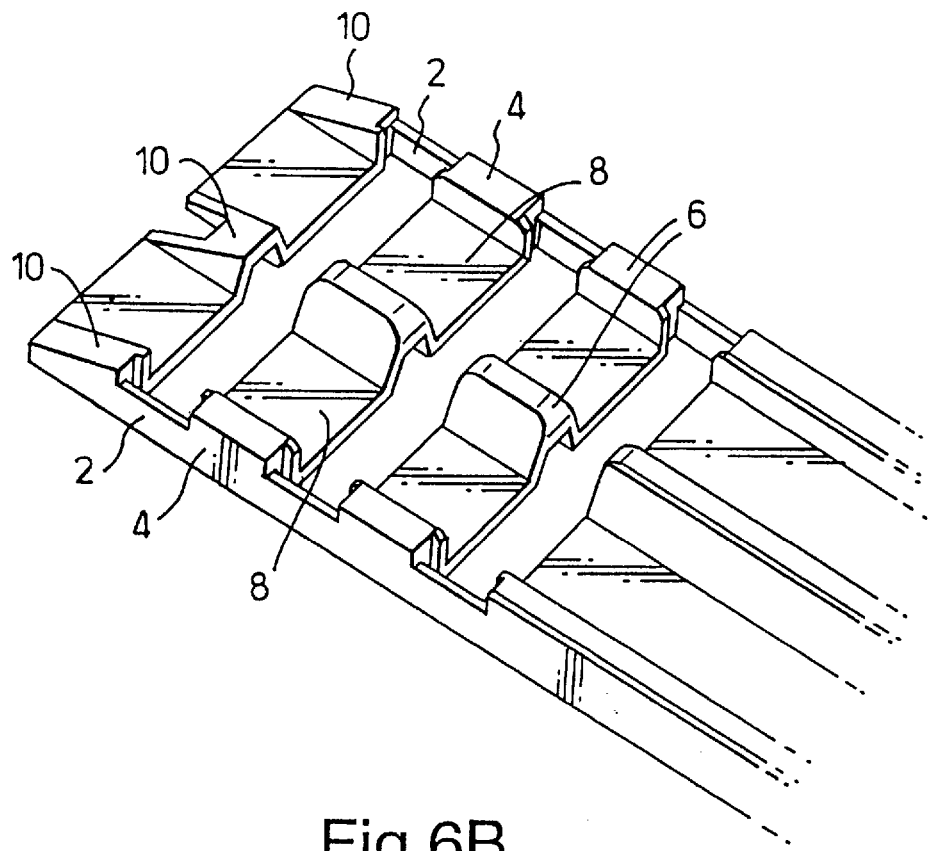
FIGS. 6A–6B illustrate a preferred type of a cable gripping strip which may be used in the closure according to the invention.
Figure 6B:
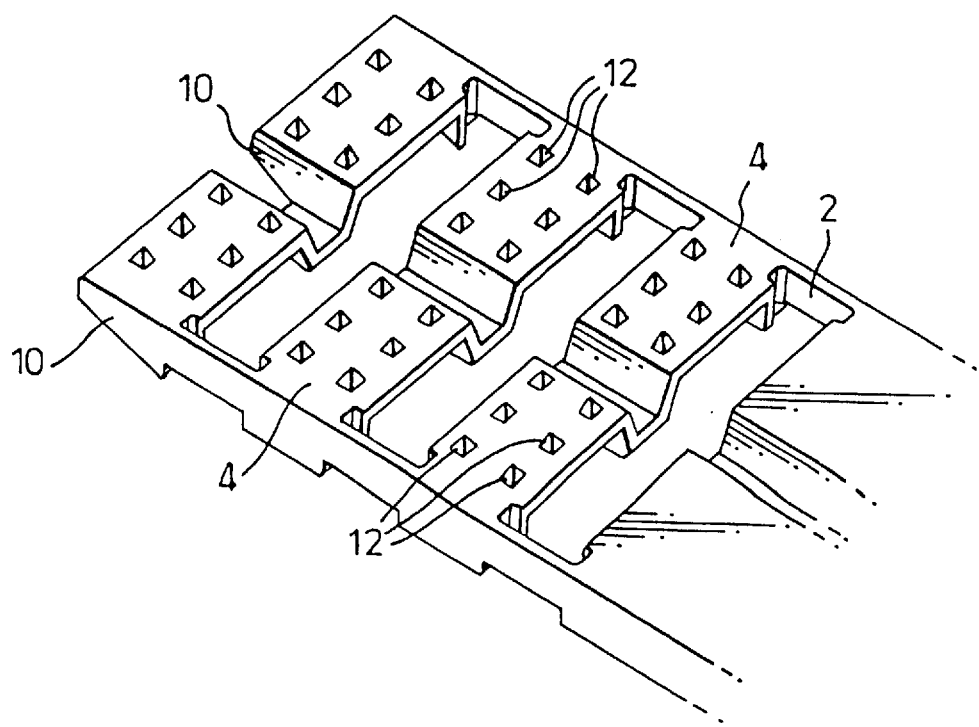

The cable openings 19 in the spaced-apart walls 17 contain grooves 18, with which corresponding ridges in cable gripping strips wound around the cables interlock, in use, thereby securing the cables to the closure. A preferred type of cable gripping strip, or retention strip, is illustrated in FIG. 6. FIGS. 6A and 6B illustrate opposite sides of the strip. The strip comprises a plurality of alternately collapsible portions 2 and non-collapsible portions 4 along its length. The collapsible portions 2 comprise webs extending between adjacent pairs of non-collapsible portions 4, which can collapse by deformation when the strip is wound around a cable and then compressed. The non-collapsible portions 4 have the ridges 6 which interlock, in use, with the grooves 18 in the cable openings 19 in the walls 17 of the housing parts. Between the ridges 6 are recesses 8. At the ends of the strip the non-collapsible portions 10 may be tapered to smooth the inner an outer ends of the strip when wound. A plurality of gripping protrusions 12 may be provided on one side of the strip for gripping a cable.

The two half-shell housing parts 3 illustrated in FIG. 1A may be joined together by an interlocking (e.g. snap-fit) connector 27, i.e. resilient catches or protrusions on the other housing part (not shown) which interlock with the holes of the up-standing connector 27 of the housing part 3 which is shown. However, generally any suitable connector may be used, e.g. screws, bolts, clamps, catches, etc. Furthermore, generally any combination of connectors may be used; for example screw-threaded parts 29 are provided on the housing part 3 illustrated in FIG. 1A, to ensure a tight connection between the two half-shell housing parts at the ends thereof, i.e. at the end seals and triple point seals. Attachment means, e.g. screw-thread part 31, may be provided to enable the closure to be attached to another structure, e.g. a wall or other support.

Figure 1B:
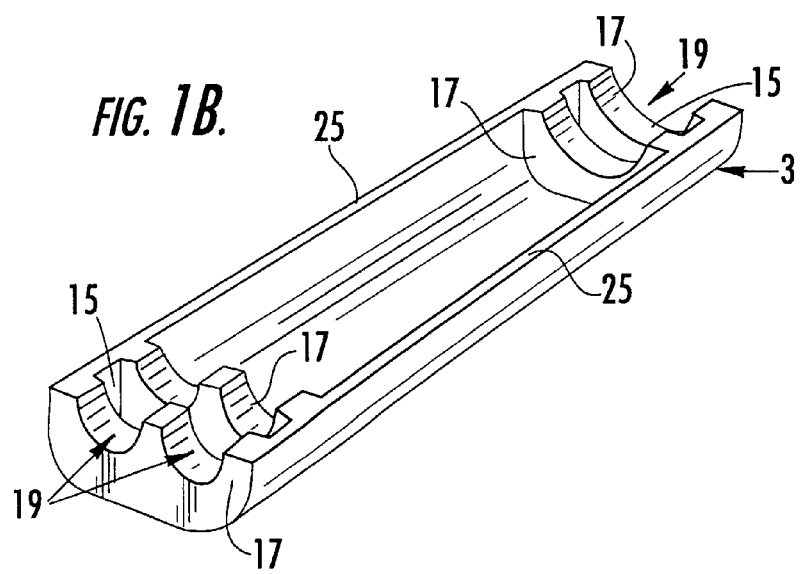

FIG. 1B illustrates, schematically, the full length of the half-shell housing part 3. The half-shell illustrated has two cable openings at one end, and one cable openings at the opposite end, but generally any combination of numbers of cable openings may be provided. Ordinarily between one and four openings will be provided at each end of the closure.

Figure 2:
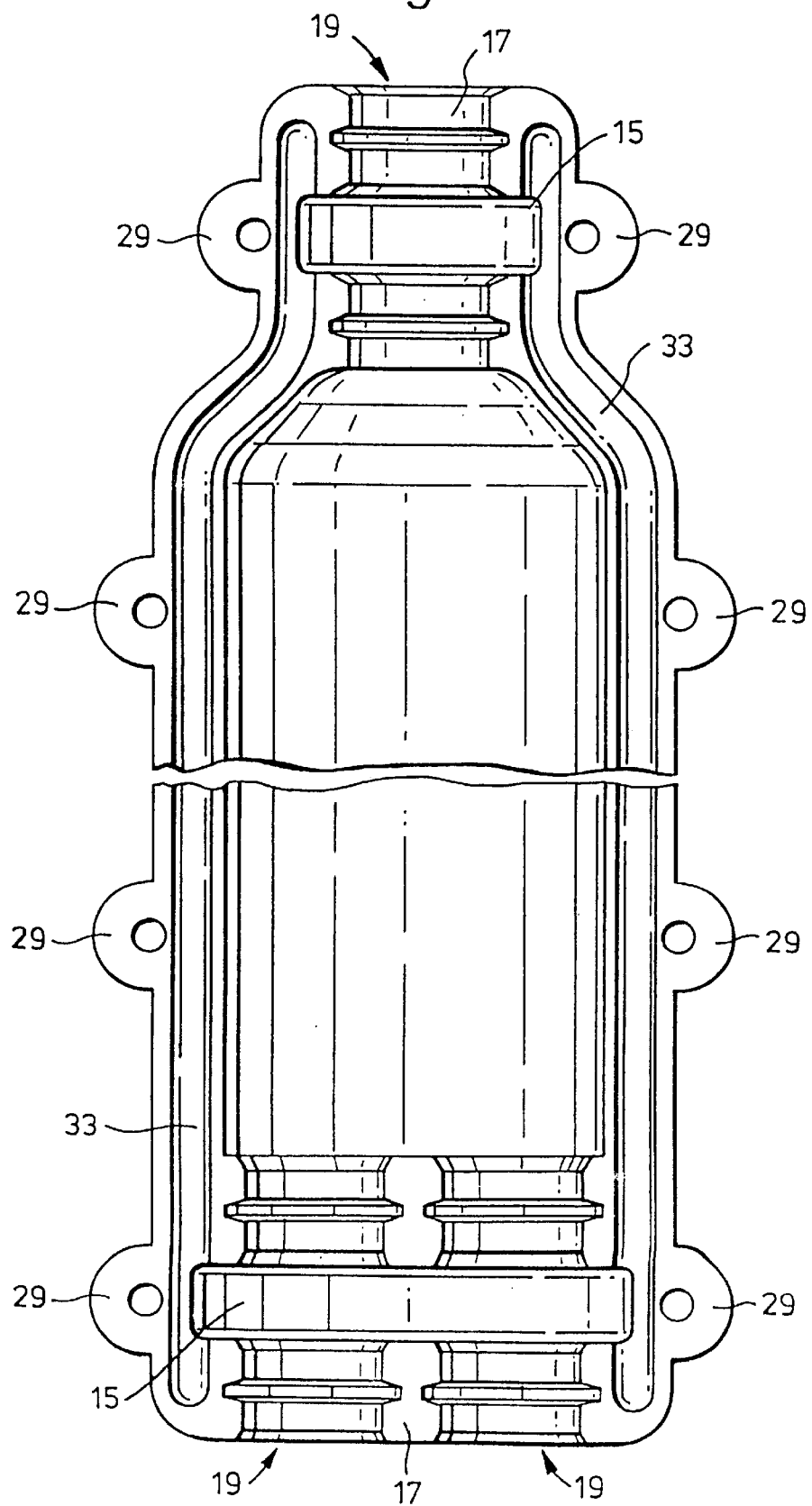
FIG. 2 illustrates, in plan view, one housing part of a cable closure according to the invention.

FIG. 2 illustrates, in plan view, another half-shell housing part 3. Grooves 33 for the elongate sealing members 23 are illustrated, as is the reduced wall thickness in the region of the cavities 15 which causes the sealing members to protrude into the cavities.

Figure 3:
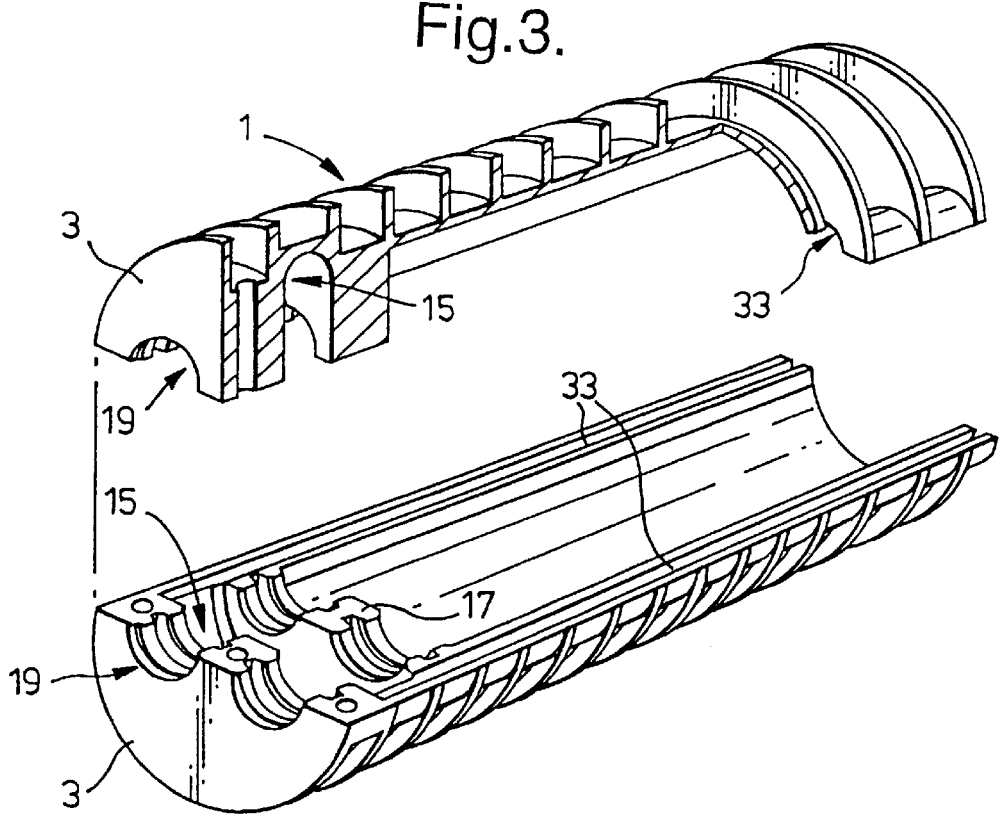
FIG. 3 illustrates, in perspective, parts of two housing parts of a cable closure according to the invention.

FIG. 3 illustrates part of another cable splice closure 1 according to the invention. Here both half-shells 3 are illustrated.

Figure 4:
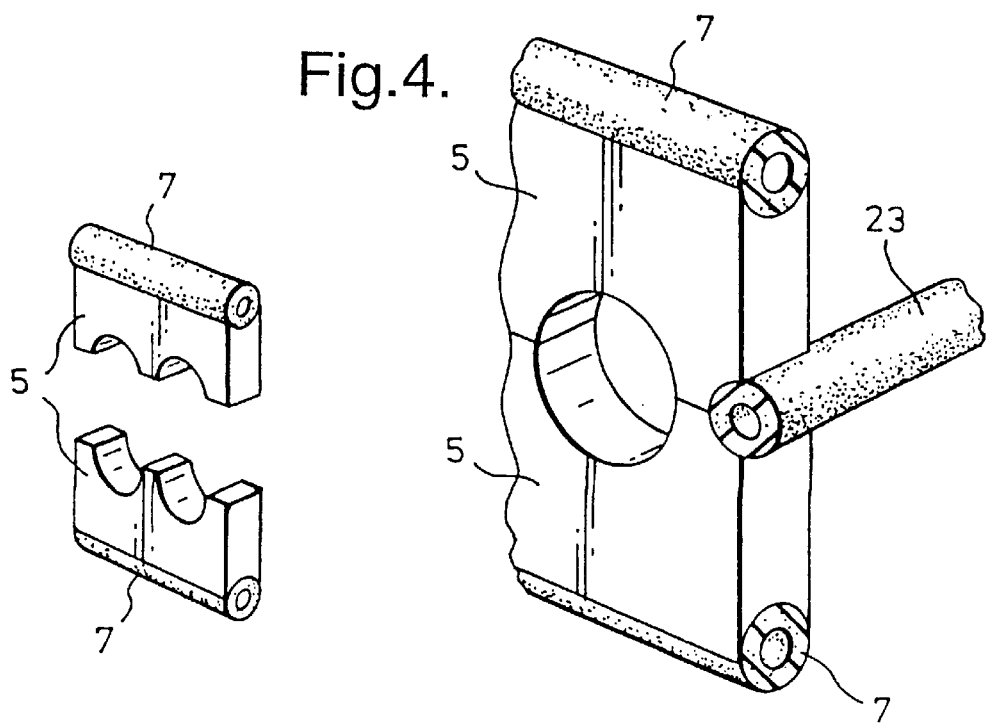
FIG. 4 illustrates, in perspective, the fitting together of sealing material, resilient members, and an elongate sealing member of a cable closure according to the invention.

FIG. 4 illustrates, schematically and in perspective, how the sealing material 5, the resilient members 7 (which, in this case comprise elastomeric tubes) and the elongate sealing members fit together, i.e. conform to each other, in use, to ensure that the closure is reliably sealed.

FIGS. 5A–5C illustrate, schematically, the formation of a triple point seal in a cable closure according to the invention. Bringing the housing parts 3 together causes the sealing material 5 to be put under compression, and preferably (as illustrated) causes some of the sealing material to become trapped in a gab between the elongate sealing member 23 and each opposed edge face 25 of the housing parts 3. In this way it is substantially ensured that the sealing material is in sealing contact with both the elongate sealing member 23 and the housing part 3 right at the triple points T. If there is any gap remaining between a housing part 3 and the elongate sealing member 23, it will normally be on the outside (with respect to the interior of the closure) surface of sealing member 23, and thus will not provide a path for moisture to enter the closure.

Figure 7:
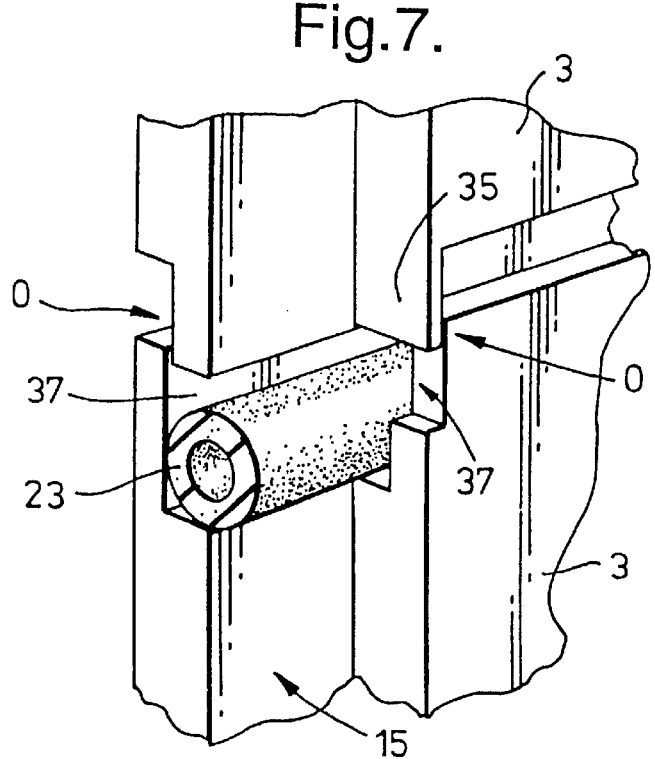
FIG. 7 illustrates a detail of a sealing material containment barrier of a cable closure according to the invention.

FIG. 7 shows the detail of a preferred cable closure 1 according to the invention. The detail shows a sealing material containment barrier 35 extending from one of the housing parts 3 such that it overlaps part of the housing part 3 at a periphery of the cavity 15 as the housing parts are bought together. As the housing parts 3 are brought together, the barrier 35 overlaps the other housing part before the sealing material (not shown) begins to experience a compressive force. To facilitate this overlapping, the other housing part has a recess 37 into which the barrier 35 locates as the two housing parts are brought together. The overlapping is indicated O.

Figure 8B:
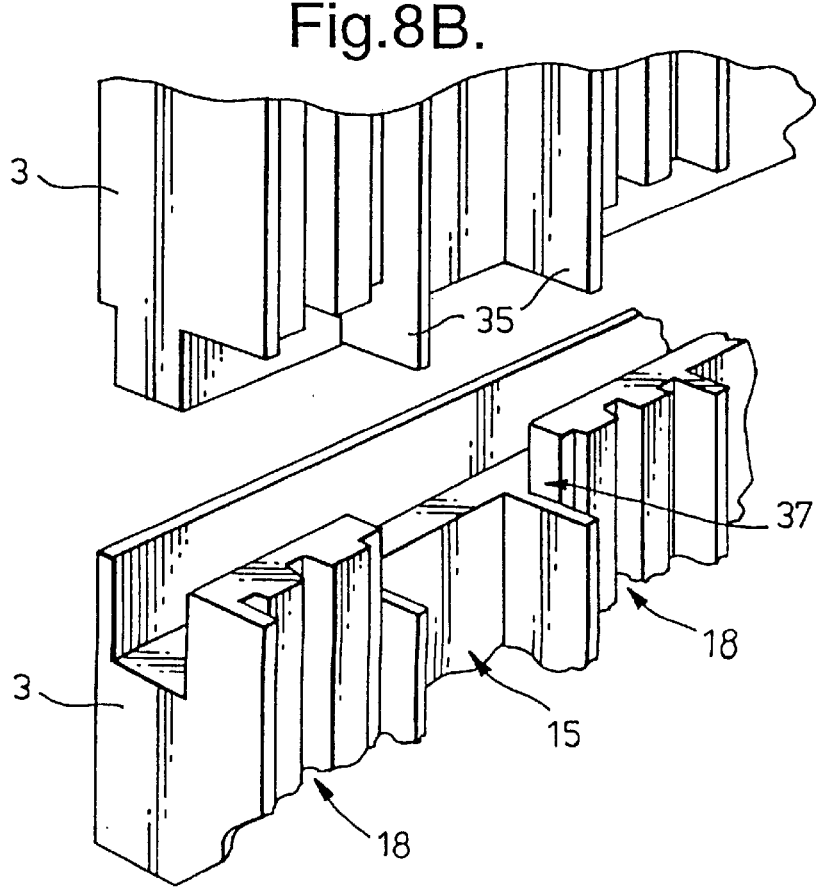
FIGS. 8A–8C illustrate some more sealing material containment barriers of a cable closure according to the invention.
Figure 8A:
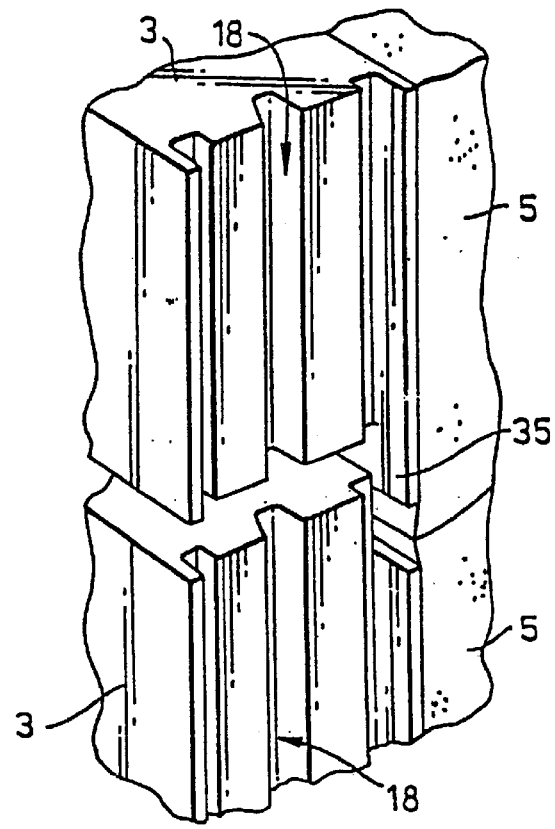
Figure 8C:
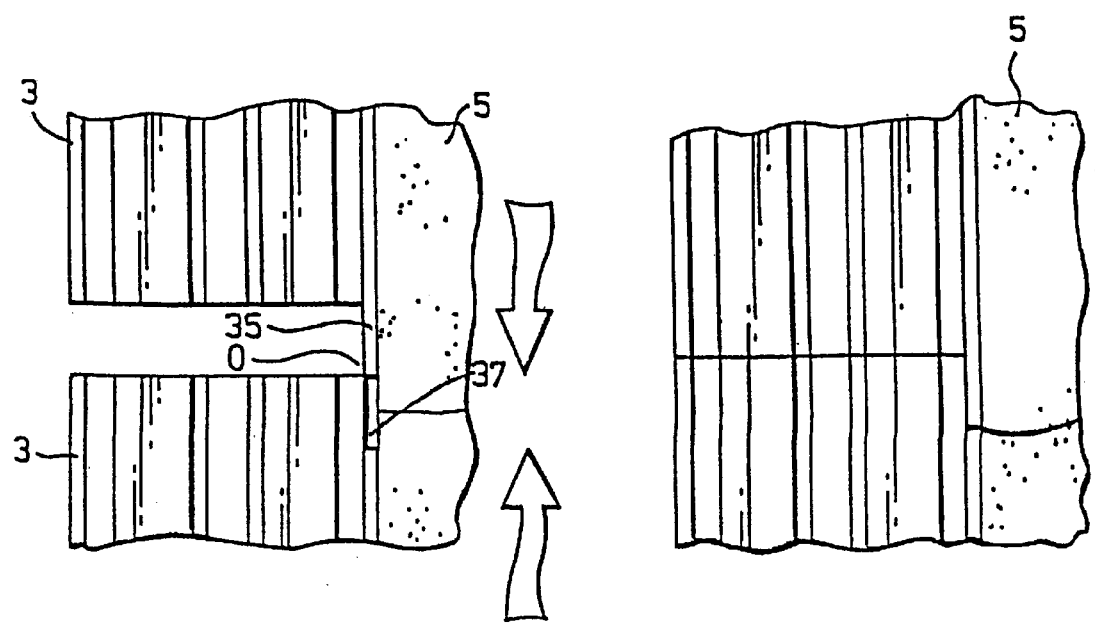

FIGS. 8A–8C show some more details of sealing material containment barriers 35 and corresponding recesses 37 used in preferred cable closures according to the invention. By the barriers 35 and recesses 37, substantially complete containment of the sealing material in the cavity 15 can normally be assured. If the barriers were not present, some egress of the sealing material between the housing parts 3 due to some compression of the sealing material before complete closure of the cavity 15 might, at least in some circumstances, occur.

What is claimed is:

1. A cable closure comprising:
   a housing including at least two housing parts which together define at least one sealing material cavity through which at least one cable can extend into the housing;
   sealing material (5) contained in the at least one sealing material cavity for sealing the cable closure between the housing and the at least one cable; and
   at least one spring contained in the sealing material cavity for applying a compressive force to the sealing material, the spring comprising at least one of a leaf spring and a helical spring.

2. A cable closure according to claim 1, wherein the at least one resilient member applies the compressive force in a direction which is substantially perpendicular to the direction in which the at least one cable extends into the housing.

3. A cable closure according to claim 1, wherein the at least one resilient member further comprises at least one plate for applying the compressive force from the at least one spring to the sealing material.

4. A cable closure according to claim 1, further comprising at least one gripping member for gripping one or more cables when extending through the cavity.

5. A cable closure according to claim 4, wherein the at least one gripping member comprises a strip for winding around the at least one cable and for interlocking with at least one of the at least two housing parts.

6. A cable closure according to claim 1, wherein the housing is for enclosing a cable splice.

7. A cable closure according to claim 1, wherein the at least two housing parts comprise two half-shells.

8. A cable closure according to claim 1, wherein at least one of the at least two housing parts further comprises at least one containment portion for containing the sealing material in the cavity while the at least two housing parts are together.

9. A cable closure according to claim 8, wherein the at least one containment portion comprises a barrier extending from one of the at least two housing parts such that it overlaps part of another of the at least two housing parts while the at least two housing parts are together.

10. A cable closure according to claim 1, further comprising at least one elongate sealing member for sealing between opposed edge faces of the at least two housing parts, and for sealingly contacting the sealing material in the sealing material cavity.

11. A cable closure according to claim 10, wherein a portion of the at least one elongate sealing member protrudes transversely into the sealing member cavity, wherein the portion comprises at least about a third of the transverse cross-sectional area of the at least one elongate sealing member, and wherein a substantial transverse periphery of the portion sealingly contacts the sealing material in the sealing material cavity.

12. A cable closure according to claim 11, wherein the portion comprises about a half of the transverse cross-sectional area of the at least one elongate sealing member.

13. A cable closure according to claim 11, wherein the opposed edge faces of the at least two housing parts include narrow portions adjacent the sealing material cavity, the narrow portions being relatively more narrow in transverse width than remaining portions of the opposed edge faces, and wherein the narrow portions cause the portion of the at least one elongate sealing member to protrude transversely into the cavity.

14. A cable closure according to claim 11, wherein some of the sealing material in the sealing material cavity is trapped between the at least one elongate sealing member and the opposed edge faces of the at least two housing parts.

15. A cable closure comprising:

a housing including at least two housing parts which together define at least one sealing material cavity through which at least one cable can extend into the housing, the at least two housing parts including opposed edge faces;

sealing material contained in the at least one sealing material cavity for sealing the cable closure between the housing and the at least one cable; and at least one elongate sealing member for sealing between the opposed edge faces of the at least two housing parts and for sealingly contacting the sealing material in the sealing material cavity, wherein a portion of the at least one elongate sealing member protrudes transversely into the sealing material cavity, wherein the portion comprises at least about a third of the transverse cross-sectionnal area of the at least one elongate sealing member, and wherein a substantial transverse periphery of the portion sealingly contacts the sealing material in the sealing material cavity;

wherein the opposed edge faces of the at least two housing parts include narrow portions adjacent the sealing material cavity, the narrow portions being relatively more narrow in transverse width than remaining portions of the opposed edge faces, and wherein the narrow portions cause the portion of the at least one elongate sealing member to protrude transversely into the cavity.

16. A cable closure according to claim 15, wherein the portion comprises about a half of the transverse cross-sectional area of the at least one elongate sealing member.

17. A cable closure according to claim 15, wherein some of the sealing material in the sealing material cavity is trapped between the at least one elongate sealing member and the opposed edge faces of the at least two housing parts.

* * * * *